US006168181B1

United States Patent
Gadd

(10) Patent No.: US 6,168,181 B1
(45) Date of Patent: Jan. 2, 2001

(54) TRAILER ALIGNMENT BACKING AID FOR VEHICLES

(76) Inventor: Ben R. Gadd, 4108 No Barr, Oklahoma City, OK (US) 73122

( * ) Notice: Under 35 U.S.C. 154(b), the term of this patent shall be extended for 0 days.

(21) Appl. No.: 09/199,099

(22) Filed: Nov. 24, 1998

Related U.S. Application Data

(60) Provisional application No. 60/067,801, filed on Dec. 3, 1997.

(51) Int. Cl.[7] ................................................ B60D 13/00
(52) U.S. Cl. ............................ 280/477; 33/263; 33/286; 116/28 R
(58) Field of Search ........................... 33/288, 286, 263; 280/477, 511; 116/28 R

(56) References Cited

U.S. PATENT DOCUMENTS

| | | | |
|---|---|---|---|
| 3,015,162 | * 1/1962 | Bohnet | 116/28 R |
| 3,159,917 | * 12/1964 | Whitehead | 116/28 R |
| 3,702,029 | 11/1972 | Anderson, Jr. | 33/246 |
| 3,765,703 | 10/1973 | Voelkerding et al. | 280/477 |
| 4,054,302 | * 10/1977 | Campbell | 280/477 |
| 4,560,183 | * 12/1985 | Cook | 280/477 |
| 4,627,634 | * 12/1986 | Coleman | 280/477 |
| 4,666,176 | 5/1987 | Sand | 280/477 |
| 4,723,788 | 2/1988 | Suter | 280/477 |
| 4,807,899 | * 2/1989 | Belcher | 280/477 |
| 4,972,596 | * 11/1990 | Brewer | 33/367 |
| 5,035,441 | 7/1991 | Murray | 280/477 |
| 5,113,588 | 5/1992 | Walston | 33/264 |
| 5,114,168 | * 5/1992 | Kehl | 280/414.1 |
| 5,114,170 | * 5/1992 | Lanni et al. | 280/477 |
| 5,269,554 | 12/1993 | Law et al. | 280/477 |
| 5,558,352 | 9/1996 | Mills | 280/477 |
| 5,669,621 | * 9/1997 | Lockwood | 280/477 |
| 5,680,706 | * 10/1997 | Talcott | 33/286 |

\* cited by examiner

*Primary Examiner*—Diego Gutierrez
*Assistant Examiner*—Maria Fernandez
(74) *Attorney, Agent, or Firm*—Joseph N. Breaux

(57) ABSTRACT

A trailer alignment backing aid for vehicles that includes a target sticker and a hitch ball attachable aiming tube assembly. The target sticker has aiming indicia provided on a front surface thereof and an adhesive covered back surface having a peel off backing cover. The hitch ball attachable aiming tube assembly includes a ball attachment tube and an extender tube. The ball attachment tube includes two ball insertion flaps at a lower end thereof, a trailer tongue insertion window adjacent to the ball insertion flaps, and incremental measuring marks along the length thereof. The two ball insertion flaps are sized and spaced to resiliently grip the ball of a ball hitch and maintain the hitch ball attachable aiming tube assembly in an upright position during use. The trailer tongue insertion window is sized such that the tongue of a trailer is positionable therein and over the ball of the trailer hitch that is gripped between the insertion flaps before the trailer tongue contacts the ball attachment tube displacing the hitch ball attachable aiming tube assembly to alert the driver that the tongue of the trailer is in the correct position. In a preferred embodiment, the extender tube is slidable into the ball attachment tube.

2 Claims, 3 Drawing Sheets

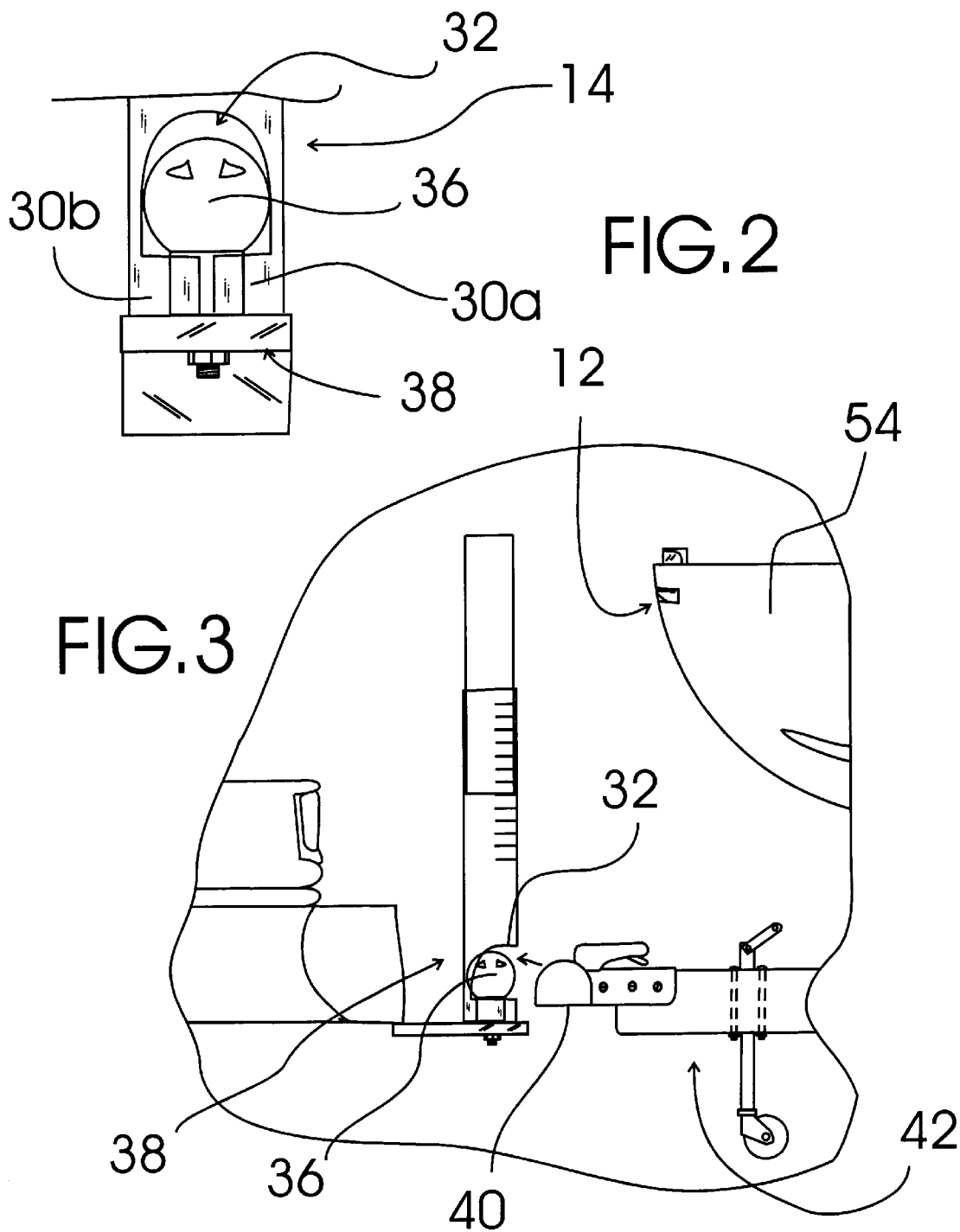

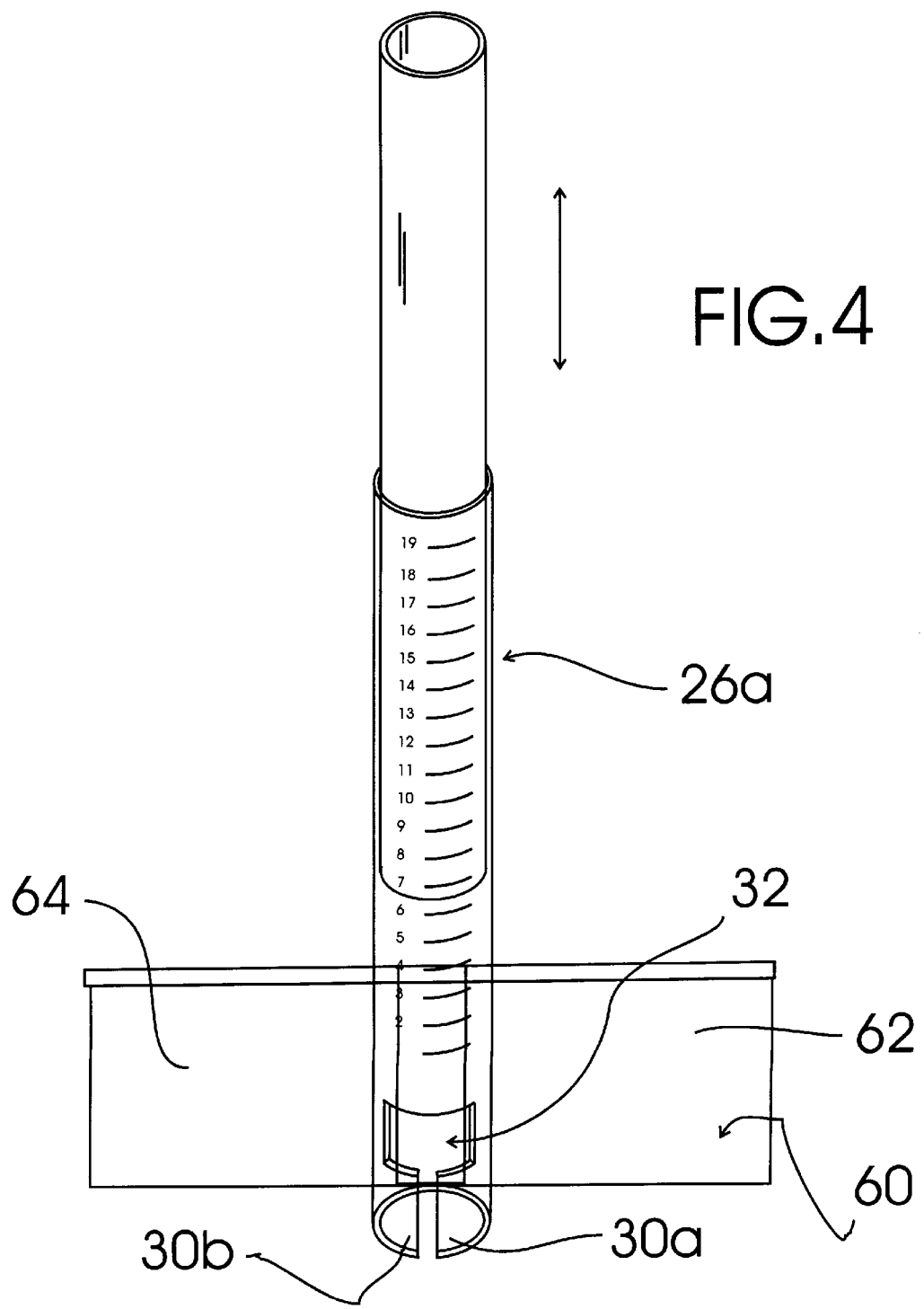

US 6,168,181 B1

TRAILER ALIGNMENT BACKING AID FOR VEHICLES

This application claims benefit to U.S. provisional application Ser. No. 60/067,801 filed Dec. 3, 1997.

TECHNICAL FIELD

The present invention relates to vehicle positioning aids and more particularly to a trailer alignment backing aid for a vehicle that includes a target sticker with an adhesive covered back surface and a peel off backing and a hitch ball attachable aiming tube assembly; the hitch ball attachable aiming tube assembly including a ball attachment tube and an extender tube; the ball attachment tube including two ball insertion flaps at a lower end thereof, a trailer tongue insertion window adjacent to the ball insertion flaps, and incremental measuring marks along the length thereof; the two ball insertion flaps being sized and spaced to resiliently grip the ball of a ball hitch and maintain the hitch ball attachable aiming tube assembly in an upright position; the trailer tongue insertion window being sized such that the tongue of a trailer is positionable therein and over the ball of the trailer hitch before the tongue contacts the ball attachment tube; the extender tube being slidable into the ball attachment tube.

BACKGROUND OF THE INVENTION

Many drivers find it difficult or impossible to back a vehicle having a trailer hitch in a manner such that the vehicle is stopped with the ball of the trailer hitch positioned beneath the tongue of the trailer. It would be a benefit to these drivers to provide a trailer alignment backing aid that can be used to assist a driver in verifying the location of the ball of the trailer hitch when backing the vehicle toward the tongue of the trailer. It would also be a benefit if the backing aid included a measuring mechanism for allowing a driver to verify that the tongue of the trailer is positioned at height that is slightly greater than the top of the ball of the trailer hitch.

SUMMARY OF THE INVENTION

It is thus an object of the invention to provide a trailer alignment backing aid for vehicles that is attachable to the ball of a trailer hitch and that provides a visual indication to the driver of the vehicle of the location of the ball of the trailer hitch.

It is a further object of the invention to provide a trailer alignment backing aid for vehicles that includes a measuring mechanism for allowing a driver to verify the height of the tongue of the trailer.

It is a still further object of the invention to provide a trailer alignment backing aid for vehicles that includes a target sticker and a hitch ball attachable aiming tube assembly; the target sticker having aiming indicia provided on a front surface thereof and an adhesive covered back surface having a peel off backing cover; the hitch ball attachable aiming tube assembly including a ball attachment tube and an extender tube; the ball attachment tube including two ball insertion flaps at a lower end thereof, a trailer tongue insertion window adjacent to the ball insertion flaps, and incremental measuring marks along the length thereof; the two ball insertion flaps being sized and spaced to resiliently grip the ball of a ball hitch and maintain the hitch ball attachable aiming tube assembly in an upright position; the trailer tongue insertion window being sized such that the tongue of a trailer is positionable therein and over the ball of the trailer hitch before the tongue contacts the ball attachment tube; the extender tube being slidable into the ball attachment tube.

It is a still further object of the invention to provide a trailer alignment backing aid for vehicles that accomplishes all or some of the above objects in combination.

Accordingly, a trailer alignment backing aid for vehicles is provided. The trailer alignment backing aid for vehicles includes a target sticker and a hitch ball attachable aiming tube assembly; the target sticker having aiming indicia provided on a front surface thereof and an adhesive covered back surface having a peel off backing cover; the hitch ball attachable aiming tube assembly including a ball attachment tube and an extender tube; the ball attachment tube including two ball insertion flaps at a lower end thereof, a trailer tongue insertion window adjacent to the ball insertion flaps, and incremental measuring marks along the length thereof; the two ball insertion flaps being sized and spaced to resiliently grip the ball of a ball hitch and maintain the hitch ball attachable aiming tube assembly in an upright position; the trailer tongue insertion window being sized such that the tongue of a trailer is positionable therein and over the ball of the trailer hitch before the tongue contacts the ball attachment tube; the extender tube being slidable into the ball attachment tube.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 2 is a plan view showing the lower portion of the transparent ball attachment tube with the ball insertion flaps resiliently gripping the ball of a representative ball hitch and the ball of the representative ball hitch extending into the trailer tongue insertion window.

FIG. 3 is a side plan view showing the hitch ball attachable aiming tube assembly attached to the ball of a representative ball hitch, the trailer tongue of a representative trailer positioned behind the ball of the trailer hitch, and the exemplary target sticker adhesively attached to the bow of a representative boat.

FIG. 4 is a perspective view of a second exemplary embodiment of the hitch ball attachable aiming tube assembly including the ball attachment tube and the extender tube, the ball attachment tube including the ball insertion flaps, the trailer tongue insertion window, incremental measuring marks along the length thereof, and an extender plate secured to the bottom of the ball attachment tube behind the ball insertion flaps, the trailer tongue insertion window; the extender tube being slidable into the ball attachment tube.

EXEMPLARY EMBODIMENTS

Figure 1:
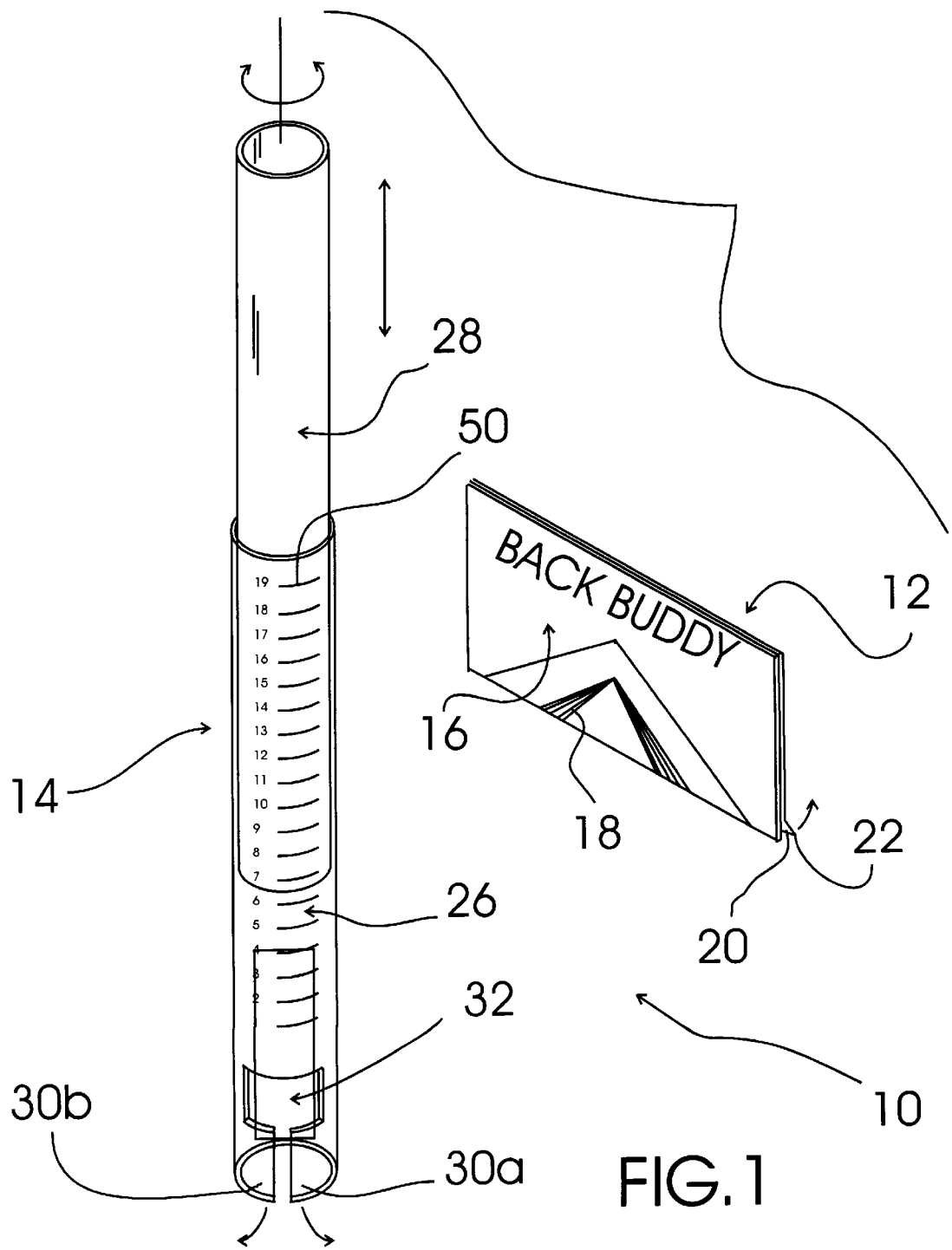
FIG. 1 is a perspective view of an exemplary embodiment of the trailer alignment backing aid of the present invention showing the target sticker with the peel off backing and the hitch ball attachable aiming tube assembly, the hitch ball attachable aiming tube assembly including the ball attachment tube and the extender tube, the ball attachment tube including the ball insertion flaps, the trailer tongue insertion window, and incremental measuring marks along the length thereof, the extender tube being slidable into the ball attachment tube.

FIG. 1 shows an exemplary embodiment of the trailer alignment backing aid of the present invention, generally designated by the numeral 10. In this embodiment, backing aid 10 includes a target sticker, generally designated 12; and a hitch ball attachable aiming tube assembly, generally designated 14. Target sticker 12 is of conventional construction, measures three and one-half inches by two and one-half inches (3.5"×2.5") and includes a front surface 16 having aiming indicia 18 provided thereon and an adhesive covered back surface 20 having a peel off backing cover 22. In this embodiment, aiming indicia 18 is a series of different colored triangles set within each other.

Hitch ball attachable aiming tube assembly 14 includes a ball attachment tube, generally designated 26; and an extender tube, generally designated 28. Ball attachment tube 26 is of transparent plastic construction and has a one and five-eighths inch internal diameter. Two resilient ball insertion flaps 30a,30b are provided at a lower end thereof and a trailer tongue insertion window 32 is provided just above insertion flaps 30a,30b. In this embodiment flaps 30a,30b are about two and one-half inches in height and insertion window 32 is about two inches in height. With reference to FIG. 2, as discussed herein before, ball insertion flaps 30a,30b are sized and spaced to resiliently grip the ball 36 of a ball hitch, generally designated 38, with sufficient gripping force to maintain hitch ball attachable aiming tube assembly 14 in an upright position during use. With reference to FIG. 3, trailer tongue insertion window 32 is sized such that the tongue 40 of a trailer, generally designated 42, is positionable therein and over ball of trailer hitch 38. Ball attachment tube 26 also includes incremental measuring marks 50 along the length thereof. Each measuring mark 50 includes a numerical indicator in the manner of a ruler to allow a user to measure the height of the trailer tongue 40 (FIG. 3) before beginning the backing procedure.

With reference back to FIG. 1, in this embodiment, extender tube 28 is slidable into ball attachment tube 26. Providing a slidable extender tube 28 allows the user to adjust the top end of the extender tube 28 to a height that corresponds with the placement of, with reference now to FIG. 3, target sticker 12. In this example, target sticker 12 is attached to the bow of a boat 54. It has been found by the inventor hereof that the target sticker 12 is particularly effective when backing the hitch into connection with the tongue of a travel trailer or other towable vehicle that is not as symmetrical about its center as for instance a boat.

With reference to FIG. 4, it has also been found effective with novice drivers to provide a ball attachment tube 26a that is identical to ball attachment tube 26 (FIG. 1) except ball attachment tube 26a includes rigid plastic extender plate 60 that is secured to the bottom of ball attachment tube 26a behind ball insertion flaps 30a,30b and trailer tongue insertion window 32. Extender plate 60 has a left portion 62 and a right portion 64 that each extend past the sidewall of ball attachment tube 26a to provide areas for the trailer tongue to strike bending ball attachment tube 26a should the novice driver miss trailer tongue insertion window 32.

It can be seen from the preceding description that a trailer alignment backing aid for vehicles has been provided that is attachable to the ball of a trailer hitch and that provides a visual indication to the driver of the vehicle of the location of the ball of the trailer hitch; that includes a measuring mechanism for allowing a driver to verify the height of the tongue of the trailer; and that includes a target sticker and a hitch ball attachable aiming tube assembly; the target sticker having aiming indicia provided on a front surface thereof and an adhesive covered back surface having a peel off backing cover; the hitch ball attachable aiming tube assembly including a ball attachment tube and an extender tube; the ball attachment tube including two ball insertion flaps at a lower end thereof, a trailer tongue insertion window adjacent to the ball insertion flaps, and incremental measuring marks along the length thereof; the two ball insertion flaps being sized and spaced to resiliently grip the ball of a ball hitch and maintain the hitch ball attachable aiming tube assembly in an upright position; the trailer tongue insertion window being sized such that the tongue of a trailer is positionable therein and over the ball of the trailer hitch before the tongue contacts the ball attachment tube; the extender tube being slidable into the ball attachment tube.

It is noted that the embodiment of the trailer alignment backing aid for vehicles described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. In combination, a trailer alignment backing aid, a trailer ball hitch, and a tongue of a trailer, for aligning a vehicle provided with said trailer hitch ball to a trailer having said tongue and a structure, said aid comprising;

a target sticker mounted on said structure; and a hitch ball attachable aiming tube assembly;

said target sticker having aiming indicia provided on a front surface thereof and an adhesive covered back surface having a peel off backing cover;

said hitch ball attachable aiming tube assembly including a ball attachment tube and an extender tube;

said extender tube being slidable into said ball attachment tube;

said ball attachment tube including two ball insertion flaps at a lower end thereof, a trailer tongue insertion window adjacent to said ball insertion flaps, and incremental measuring marks along the length thereof;

said two ball insertion flaps being sized and spaced apart for resiliently gripping a ball of said ball hitch and maintaining said hitch ball attachable aiming tube assembly in an upright position;

said trailer tongue insertion window being sized such that, said tongue of the trailer is positioned therein and over said ball of the trailer hitch before the tongue contacts said ball attachment tube.

2. The combination of claim 1 further comprising:

a rigid plastic extender plate that is secured to a bottom of said ball attachment tube behind said ball insertion flaps and said trailer tongue insertion window, said extender plate having a left portion and a right portion that each extend past a sidewall of said ball attachment tube.

* * * * *